(12) United States Patent
Li et al.

(10) Patent No.: US 8,320,500 B2
(45) Date of Patent: Nov. 27, 2012

(54) CLUSTERED OFDM WITH CHANNEL ESTIMATION

(75) Inventors: Ye Li, Holmdel, NJ (US); Nelson Ray Sollenberger, Tinton Falls, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 963 days.

(21) Appl. No.: 12/151,419

(22) Filed: May 6, 2008

(65) Prior Publication Data
US 2009/0003489 A1 Jan. 1, 2009

Related U.S. Application Data

(63) Continuation of application No. 10/875,597, filed on Jun. 24, 2004, now Pat. No. 7,369,487, which is a continuation of application No. 09/535,945, filed on Mar. 27, 2000, now Pat. No. 6,795,392.

(51) Int. Cl.
*H03K 9/00* (2006.01)
(52) U.S. Cl. ........ 375/316; 375/347; 375/267; 375/346; 455/137; 455/273
(58) Field of Classification Search .................... 375/316
See application file for complete search history.

(56) References Cited

U.S. PATENT DOCUMENTS

| | | | |
|---|---|---|---|
| 5,481,570 A * | 1/1996 | Winters | 375/347 |
| 5,973,642 A | 10/1999 | Li et al. | |
| 6,240,141 B1 * | 5/2001 | Long | 375/260 |
| 6,249,250 B1 | 6/2001 | Namekata et al. | |
| 6,266,644 B1 * | 7/2001 | Levine | 704/503 |
| 6,298,035 B1 | 10/2001 | Heiskala | |
| 6,327,314 B1 | 12/2001 | Cimini, Jr. et al. | |
| 6,369,758 B1 | 4/2002 | Zhang | |
| 6,473,467 B1 | 10/2002 | Wallace et al. | |
| 6,618,454 B1 | 9/2003 | Agrawal et al. | |
| 6,628,638 B1 * | 9/2003 | Sato et al. | 370/343 |
| 6,795,392 B1 * | 9/2004 | Li et al. | 370/210 |
| 6,795,424 B1 | 9/2004 | Kapoor et al. | |
| 7,369,487 B2 * | 5/2008 | Li et al. | 370/210 |

OTHER PUBLICATIONS

Li et al., "Robust Channel Estimation for OFDM Systems with Rapid Dispersive Fading Channels," IEEE Transactions on Communications, vol. 46, No. 7, Jul. 1998, pp. 902-915.

* cited by examiner

*Primary Examiner* — Lihong Yu
(74) *Attorney, Agent, or Firm* — Zagorin O'Brien Graham LLP

(57) ABSTRACT

An improved OFDM receiver is realized by employing a simplified delay function for the transmissions channel. The simplified delay function yields a simplified frequency-domain correlation that is applied to develop an Eigen matrix U that is used in developing estimates of the channels. Those channel estimates are used in the receiver to develop the output signals.

15 Claims, 2 Drawing Sheets

CLUSTERED OFDM WITH CHANNEL ESTIMATION

RELATED APPLICATIONS

This application is a continuation of U.S. patent application Ser. No. 10/875,597, filed on Jun. 24, 2004, now U.S. Pat. No. 7,369,487, which is a continuation of U.S. patent application Ser. No. 09/535,945, filed Mar. 27, 2000, now U.S. Pat. No. 6,795,392, Sep. 21, 2004.

BACKGROUND OF THE INVENTION

This invention relates to channel estimation, and more particularly for channel estimation in clustered OFDM receivers.

Orthogonal frequency division multiplexing (OFDM) has been shown to be an effective technique for combating multipath fading and is, therefore, a promising technique for wideband wireless packet data. Recently, clustered OFDM has been proposed to provide in-band diversity gain with wideband dispersive fading channels and to thus improve system performance.

For clustered OFDM in high rate wireless data systems, each user accesses several OFDM clusters located at different frequencies. This is illustrated in FIG. 1, where a wideband OFDM signal is divided into many non-overlapped clusters of tones in frequency, and each user accesses several clusters of tones. For example, in the FIG. 1 arrangement User 1 utilizes the first, fifth, ninth, and thirteenth clusters; and Users 2, 3, and 4 use other clusters. In a transmitter, an error correction code such as a Reed-Solomon code or a convolutional code is used to create frequency diversity. Without channel information, differential demodulation has to be used instead of coherent demodulation, suffering a 3-4 dB loss in signal-to-noise ratio (SNR) performance. This is demonstrated in an article by Y. (Geoffrey) Li, L. J. Cimini, Jr., and N. R. Sollenberger, titled "Robust channel estimation for OFDM systems with rapid dispersive fading Channels," *IEEE Trans. On Comm.*, vol. 46, pp. 902-915, July 1998, which is hereby incorporated by reference. This reference indicates that channel estimation is desired for clustered OFDM to achieve high performance.

For classical OFDM systems, either pilot-symbol-aided or decision-directed channel estimators are used to obtain information. Similar parameter estimators are used to estimate the coefficients for the minimum-mean-square error diversity combiner (MMSE-DC) for OFDM systems with antenna arrays to suppress co-channel interference, or to estimate channel information required by the decoder of space-time code based transmitter diversity.

Prior art has shown that the optimum transform for channel estimation is the eigen matrix of the channel frequency-domain correlation matrix. Obviously, the optimum transforms depend on the channel delay profiles that vary with environments. Since there may be over a hundred contiguous tones for classical OFDM systems, the discrete Fourier transform (DFT) can be used instead of the optimum transforms, with negligible edge effects. Unfortunately, in clustered OFDM, each cluster contains many fewer tones than in classical OFDM, and those tones that are on the edge of a cluster constitute a large portion of the total number of tones in each cluster. Consequently, edge effects are unsatisfactorily large if a DFT is used for the estimator in clustered OFDM.

SUMMARY

An OFDM receiver is realized by applying incoming signals that arrive at one or more antennas, over respective transmission channels, to respective FFT elements, filtering the outputs of the FFT elements, combining the filtered signals, and applying the combined signal to a threshold element. The filter parameters are developed from channel estimates based on the signals developed by the FFT elements and the output of the threshold element, exploiting the channels' frequency correction both in time and frequency domain. The optimum channels estimator requires use of the eigen matrix of the channel's frequency-domain correlation matrix, which depends on the channels' delay profiles. In accordance with the principles disclosed herein, a simpler realization is obtained by employing a simple estimate of the delay profile, such a rectangular profile, or exponential delay profile.

DETAILED DESCRIPTION

Figure 1:
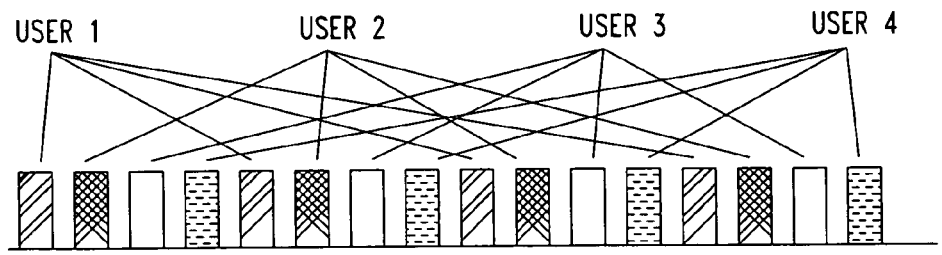
FIG. 1 describes clustered OFDM.

An OFDM signal is constructed in a transmitter by taking blocks of symbols and applying the blocks to an inverse FFT process. The signal is then transmitted, where it passes through a wireless channel before the receiver's antennas receive it.

The complex baseband representation of a wireless channel impulse response can be described by $$h(t, \tau) = \sum_k \gamma_k(t)\delta(\tau - \tau_k), \qquad (1)$$

where $\tau_k$ is the delay of the $k^{th}$ path, and $\gamma_k(t)$ is the corresponding complex amplitude. Aside from the normal time variations in the communication channel between a transmitter and a receiver, when the receiver is mobile, the movement of the mobile unit adds a variation to the communication environment. When the mobile is moving rapidly, such as when in a moving car, the communication environment, correspondingly, changes rapidly. Thus, the $\gamma_k(t)$'s can be viewed to be wide-sense stationary (WSS), narrow-band, complex Gaussian processes with average power $\sigma_k^2$'s, where the different $\sigma$'s are independent of each other.

The frequency response at time t of the time-varying wireless channel described by Equation (1) is $$H(t, f) = \int_{-\infty}^{\infty} h(t, \tau)e^{-j2\pi f\tau}d\tau = \sum_k \gamma_k(t)e^{-j2\pi f\tau_k}. \qquad (2)$$

The correlation function, at different times and frequencies, that corresponds to Equation (2) can be expressed as $$r_H(\Delta t, \Delta f) = E\{H(t+\Delta t, f+\Delta f)H^*(t,f)\}. \qquad (3)$$

It can be shown that $r_H(\Delta t, \Delta f)$ can also be expressed by $$r_H(\Delta t, \Delta f) = \sigma_h^2 r_t(\Delta t)r_f(\Delta f), \qquad (4)$$

where $\sigma_h^2$ is the total average power of the channel impulse response, defined as $$\sigma_h^2 = \sum_k \sigma_k^2,$$

and the terms $r_t(\Delta t)$ and $r_f(\Delta f)$ are the time-domain and frequency-domain correlations of the channel frequency response, defined as $$r_t(\Delta t) = \frac{E\{\gamma_k(t+\Delta t)\gamma_k^*(t)\}}{E\{|\gamma_k^*(t)|^2\}}, \quad (5)$$

and $$r_f(\Delta f) = \frac{1}{\sigma_h^2}\sum_k \sigma_k^2 e^{-j2\pi\Delta f \tau_l}, \quad (6)$$

respectively.

Figure 2:
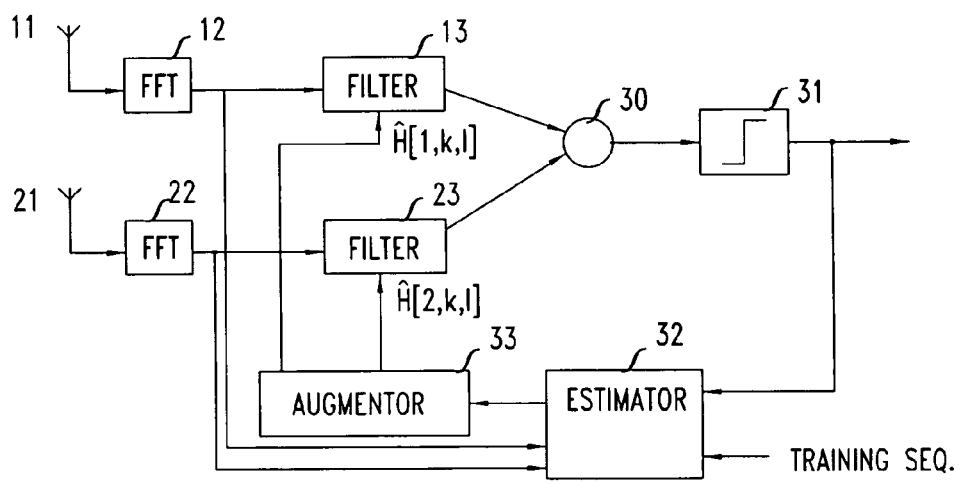
FIG. 2 depicts a block diagram of a receiver in accordance with the principles of this invention.

A block diagram of a receiver in accordance with the principles disclosed herein is shown in FIG. 2. As depicted, it contains two receiving antennas, but it should be understood that the arrangement could have one antenna or many antennas. An OFDM signal generated elsewhere by a transmitter is received at antenna 11 and is applied to FFT 12. The output signal of FFT 12 $y[1,n,k]$ corresponds to $a_{n,k}H[1,n,k]+W_{1,n,k}$, where $a_{n,k}$ is the signal encoded in the transmitter with an inverse FFT process at time n, with OFDM tone k, $H[1,n,k]$ corresponds to the transfer function of the channel between the transmitting antenna and receiving antenna 11, and $W_{1,n,k}$ is the noise received at antenna 11. The output signal of FFT 12 is applied to filter 13, which develops the signal $y[1,n,k]$ $\hat{H}^*[1,n,k]$, where $\hat{H}[1,n,k]$ is an estimate of the channel $H[1,n,k]$, obtained from estimation augmentation (AU) block 33. Similarly, an OFDM signal is received at antenna 21 and is applied to FFT 22. The output signal of FFT 22, $y[2,n,k]$, is applied to filter 23, which is responsive to signal $\hat{H}[2,n,k]$ from AU block 33. The output signals of filters 13 and 23 are combined in element 30 and applied to decision block 31. The output signal of decision block 31 is the decoded output signal, $\bar{a}[n,k]$, and that signal is applied to estimator block 32. The output of estimator block 32, which is a collection of initial channel estimates, $\tilde{H}[i,n,k]$, where, as before, i refers to the antenna (i=1,2, ... m), n refers to time, and k refers to the OFDM tones (k=1,2, ... K). This signal is applied to AU block 33, where augmented channel estimates $\hat{H}[i,n,k]$ are developed, as disclosed below.

It should be noted that during a training sequence, the signals received at antennas 11 and 21 that are applied to FFT elements 12 and 22, respectively, and to filters 13 and 23, respectively, interact with a signal from AU block 33 that results from application of the training signal to estimator block 32, rather than from application of the output signal of element 31. It should also be noted that elements 12, 22, 13, 23, 31, and 32 are well-known, conventional, elements.

With respect to each antenna i, estimator 32 develops a set of estimates that can be expressed in terms of a vector $$\tilde{H}[n,k] = \begin{bmatrix} \tilde{H}[n,1] \\ \vdots \\ \tilde{H}[n,K] \end{bmatrix} = \begin{bmatrix} y[n,1]\cdot\bar{a}^*[n,1] \\ \vdots \\ y[n,K]\cdot\bar{a}^*[n,K] \end{bmatrix}. \quad (7)$$

Figure 3:
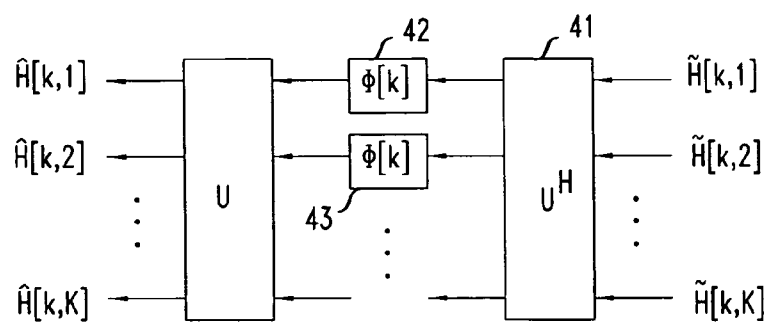
FIG. 3 shows the processing performed in AU block 33 of FIG. 2.

AU element 33 processes the elements of each such vector (i.e., separately for each receiving antenna) as shown in FIG. 3. It exploits the above-described channel's frequency correlations in both time and frequency domain. The unitary transform U exploits the frequency-domain correlations, while the linear filters $\Phi(k)$ makes full use of the time-domain correlation, where $$\Phi_l(k) = 1 - \frac{1}{M_l(-k)\gamma_l[0]}$$

and $M_l(k)$ is a stable one-sided Fourier transform $$\sum_{n=0}^{\infty}\gamma_l[n]e^{-jnk}.$$

More specifically, FIG. 3 depicts a processing that is performed on the signal developed by estimator block 32, computing a subset of the matrix product $U^H\tilde{H}$ in element 41, multiplying the subset results by $\Phi(k)$ in elements 42 and 43, and then multiplying the result by the transform U in element 44 (where the $\tilde{H}$ is the $\tilde{H}[n,k]$ of equation (7), and $U^H$ is the Hermetian of $U^H$).

FIG. 3 shows only two filters $\Phi(k)$ being employed, to illustrate the fact that some delay paths are weak enough that a computation, should it be carried out, would carry a relatively large noise component and a small signal component. In such circumstances, there is an insufficient benefit to bother with the computational burden and, accordingly, less that a full set of K filters can be employed (K/4 will typically suffice). Thus, for example, in FIG. 3 only two filters are employed, yielding $$\begin{bmatrix} \hat{H}[n,1] \\ \hat{H}[n,2] \end{bmatrix} = \begin{bmatrix} \sum_{l=1}^{2}(u_{11}u_{l1}^* + u_{12}u_{l2}^*)\cdot\sum_{m=-\infty}^{0}\Phi_1(m)\tilde{H}[k-m,l] \\ \sum_{l=1}^{2}(u_{21}u_{l1}^* + u_{22}u_{l2}^*)\cdot\sum_{m=-\infty}^{0}\Phi_2(m)\tilde{H}[k,m-1] \end{bmatrix}, \quad (8)$$

which can be generalized to:

$$\begin{bmatrix} \hat{H}[n,1] \\ \hat{H}[n,2] \\ \vdots \\ \hat{H}[n,K] \end{bmatrix} = \begin{bmatrix} \sum_{l=1}^{K}(u_{11}u_{l1}^* + u_{12}u_{l2}^*)\cdot\sum_{m=-\infty}^{0}\Phi_1(m)\tilde{H}[k-m,l] \\ \sum_{l=1}^{K}(u_{21}u_{l1}^* + u_{22}u_{l2}^*)\cdot\sum_{m=-\infty}^{0}\Phi_2(m)\tilde{H}[k-m,l] \\ \vdots \\ \sum_{l=1}^{K}(u_{K}u_{l1}^* + u_{K2}u_{l2}^*)\cdot\sum_{m=-\infty}^{0}\Phi_K(m)\tilde{H}[k-m,l] \end{bmatrix}. \quad (8a)$$

It can be shown that optimum transform matrix to be used in the FIG. 2 arrangement, $U_{opt}$, is the eigen matrix of the channel's frequency-domain correlation matrix, $R_f$, which is defined as $$R_f = \begin{bmatrix} r_f[0] & r_f[-1] & \cdots & r_f[1-K] \\ r_f[1] & r_f[0] & \cdots & r_f[2-K] \\ \vdots & \vdots & \ddots & \vdots \\ r_f[K-1] & r_f[K-2] & \cdots & r_f[0] \end{bmatrix}. \quad (9)$$

That is, $$R_f U_{opt} = U_{opt} D, \quad (10)$$

where D is a diagonal matrix. The channel's frequency-domain correlation depends on delay profiles that are different for different environments. Therefore, the optimum transforms or bases for estimators are very difficult to obtain; particularly in a changing environment that is sometimes associated with cellular telephony (e.g., when the cell phone is used in a car).

For classical OFDM, it has been demonstrated that, with negligible performance degradation, the unitary transform can be substituted by the DFT; that is, $$U_{DFT} = \frac{1}{\sqrt{K}} \left( \exp\left(j 2\pi \frac{k_1 - k_2}{K}\right) \right)_{k_1, k_2 = 1}^{K}. \quad (11)$$

However, for clustered OFDM with small clusters, the tones that are on edge are a large portion of the tones per cluster. Therefore, as indicated above, the edge effects would cause a significant performance degradation if the DFT is used in the estimator.

Although generally the delay profiles of a particular environment are not initially known, some reasonable profiles can be created that lead to transforms that perform quite well.

The simplest delay profile that provides good results is a rectangular profile, which can be expressed as $$\sigma_{rec}(\tau) = \begin{cases} \frac{1}{2\tau_{max}}, & \text{if } |\tau| \leq \tau_{max} \\ 0, & \text{otherwise} \end{cases} \quad (12)$$

where $\tau_{max}$ is half of the maximum delay span. The delay spread of the rectangular delay profile is $\tau = \tau_{max}/\sqrt{3}$. The frequency-domain correlation function can be obtained by $$r_{rec}(\Delta f) = \int_{-\tau_{max}}^{\tau_{max}} \sigma_{rec}(t) e^{-j 2\pi \Delta f \tau} d\tau = \frac{\sin(2\pi \Delta f \tau_{max})}{2\pi \Delta f \tau_{max}}. \quad (13)$$

Based on $r_{rec}(\Delta f)$, the optimum transform for the rectangular profile, $U_{rec}$, can be obtained by the means of eigen-decomposition, which is a well known technique.

Thus, by using equation (13), the various elements in the $R_f$ matrix are computed, and once the matrix is known, employing the eigen-decomposition technique provides the matrix $U_{rec}$.

Another profile that provides good results is the exponential delay profile, which is defined as $$\sigma_{exp}(\tau) = \begin{cases} \frac{1}{\bar{\tau}} e^{-\frac{\tau + \bar{\tau}}{\bar{\tau}}}, & \text{if } |\tau| \geq -\bar{\tau} \\ 0, & \text{otherwise} \end{cases} \quad (14)$$

where $\bar{\tau}$ is the delay spread. Then, the frequency-domain correlation function is $$r_{exp}(\Delta f) = \int_{-\tau_{max}}^{\tau_{max}} \sigma_{exp}(t) e^{-j 2\pi \Delta f \tau} d\tau = \frac{e^{j 2\pi \Delta f \bar{\tau}}}{j 2\pi \Delta f \bar{\tau} + 1}. \quad (15)$$

Based on it, $U_{exp}$, can be obtained in the manner analogous to the one described above.

Figure 4:
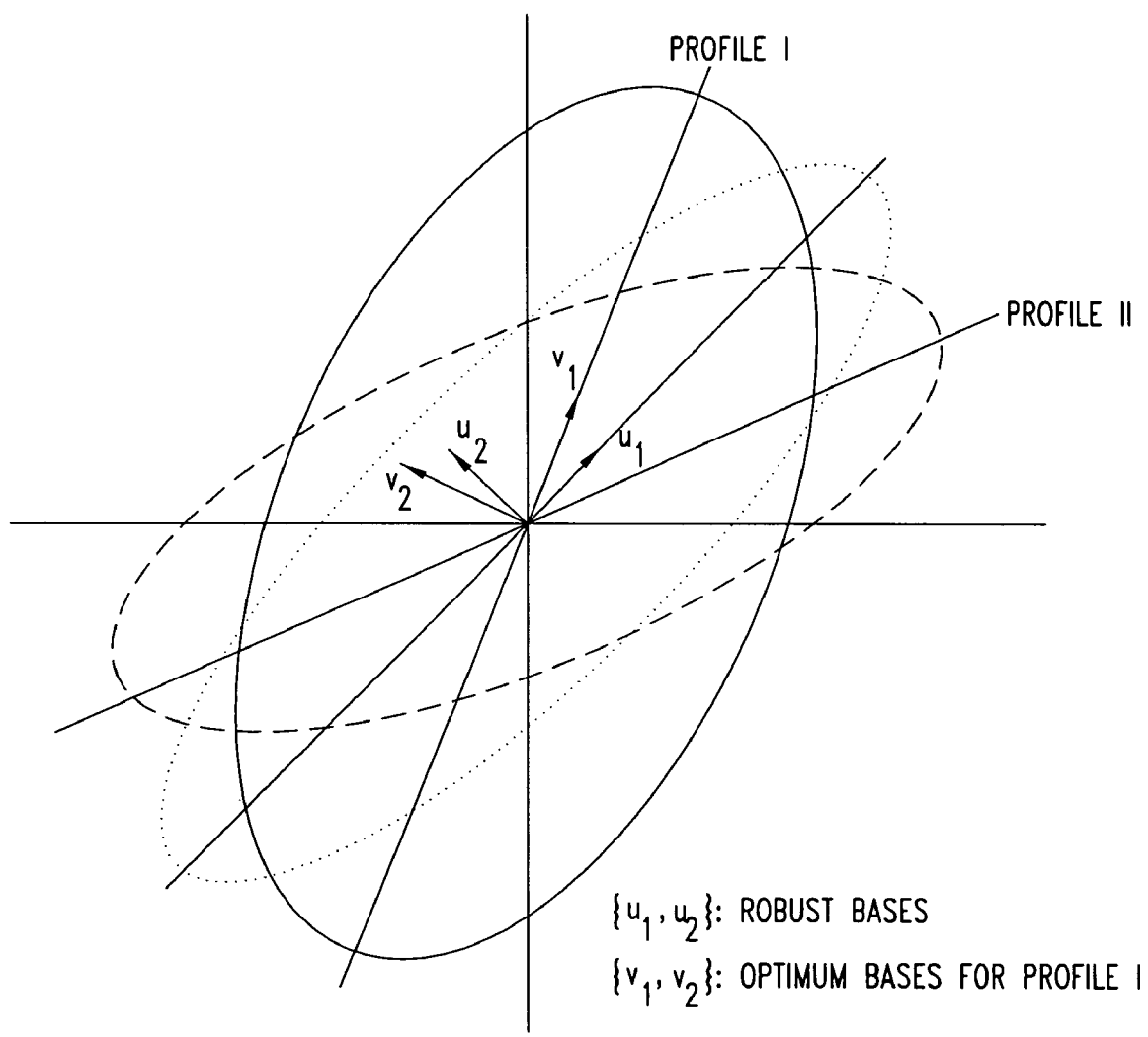
FIG. 4 presents a geometric explanation of the principles disclosed herein.

It has been demonstrated experimentally that $U_{rec}$ and $U_{exp}$, which we call the rectangular and exponential transforms, respectively, are robust to other channel delay profiles. This robustness can be appreciated by viewing FIG. 4. Since each delay profile is specified by the average power of each path and delay, an ellipse can represent the average power in the different directions. For example, in FIG. 4, the average power on each direction for delay profile I can be shown by the solid ellipse with eignvectors $v_1$, $v_2$. For each outcome of delay profile I, the channel parameters can be represented by $\alpha_1 v_1 + \alpha_2 v_2$, where $\alpha_1$ and $\alpha_2$ are time varying for a time-varying channel. It can be observed that $E|\alpha_1|^2$ is much larger than $E|\alpha_2|^2$ for delay profile I. Hence, $\alpha_1 v_1$ alone is a good approximation of the channel information. Note that $v_1$ and $v_2$ can still be used to decompose other delay profiles, such as profile II. But, the error will be very large if $\alpha_1 v_1$ alone is used for the approximation. Therefore, the optimum decomposition transform for one delay profile is not necessarily optimum for another delay profile. Consequently, it is desired to have a decomposition transform that has good, not necessarily the best, performance for all expected delay profiles with certain constrains. The $(u_1, u_2)$ transform in the figure is such a robust transform, just like $U_{rec}$ or $U_{exp}$, disclosed above.

The invention claimed is:

1. A receiver comprising:
 a plurality of branches, each including a Fast Fourier Transform (FFT) element responsive to an associated receiving antenna, followed by an associated filter, where
  each of said receiving antennas receives signals that resulted from applying a block of symbols to an Inverse Fast Fourier Transform (IFFT) element,
  the FFT element of branch i develops signals y[i,n,k],
  the filter of branch i multiplies signals y[i,n,k] by coefficients Ĥ*[i,n,k],
  coefficients Ĥ*[i,n,k] are complex conjugates of coefficients Ĥ[i,n,k] and
  coefficients Ĥ[i,n,k] are estimates of a channel through which said received signals reach the antenna of branch i, where i=1, 2, . . . , N, N being a number of branches of the plurality of branches, n refers to time, and k=1, 2, . . . , K, K being a number of orthogonal frequency division multiplexing (OFDM) tones;
 a combiner configured to combine output signals of said filters;
 a decision element responsive to an output signal of said combiner, the decision element being configured to develop a block of decoded symbols that is a decoded version of the block of symbols; and
 a channels estimator, responsive to said block of decoded symbols and to output signals of said FFT elements for developing coefficients for said filters and applying the developed coefficients to said filters.

2. The receiver of claim 1 where said channels estimator employs a delay profile of said channel.

3. The receiver of claim 1, wherein during a training sequence, said channels estimator is responsive to a training signal and responsive to output signals of said FFT elements.

4. The receiver of claim 2, wherein the delay profile is an exponential delay profile.

5. The receiver of claim 2, wherein the delay profile is a rectangular delay profile.

6. A receiver comprising:

N Fast Fourier Transform (FFT) elements responsive to a transmitted signal that is received via respective transmission channels, where said signal resulted from applying a block of symbols to an Inverse Fast Fourier Transform (IFFT) element, and the FFT elements develop respective signals y[i,n,k], where i=1, 2, ..., N, N being a number of respective transmission channels, n refers to time, and k=1, 2, ..., K, K being a number of orthogonal frequency division multiplexing (OFDM) tones;

N filters, each responsive to a respective one of said N FFT elements, where filter i multiplies signals y[i,n,k] by coefficients $\hat{H}^*[i,n,k]$, which are complex conjugates of coefficients $\hat{H}[i,n,k]$, where coefficients $\hat{H}[i,n,k]$ are an estimate of channel i of said transmission channels;

a combiner configured to combine output signals of said filters;

a decision element responsive to an output signal of said combiner, the decision element being configured to develop a block of decoded symbols, which are a decoded version of the block of symbols;

a channels estimator, responsive to the block of decoded symbols and to Y[i,n,k] for developing parameters $\hat{H}[i,n,k]$; and an augmentor element that employs time domain and frequency domain frequency correlations of said transmission channels to modify parameters $\hat{H}[i,n,k]$ to obtain coefficients $\hat{H}^*[i,n,k]$ or $\hat{H}[i,n,k]$ and apply the obtained coefficients to said filters.

7. The receiver of claim 6, wherein during a training sequence, said channels estimator is responsive to a training signal and responsive to output signals of said FFT elements.

8. The receiver of claim 6, wherein said channels estimator employs a delay profile of said transmission channels.

9. The receiver of claim 8, wherein the delay profile is a rectangular delay profile.

10. The receiver of claim 8, wherein the delay profile is an exponential delay profile.

11. A receiver comprising:

a plurality of branches each including a Fast Fourier Transform (FFT) element responsive to an associated receiving antenna of a plurality of antennas, followed by an associated filter;

a combiner configured to combine output signals of said filters;

a decision element responsive to an output signal of said combiner, the decision element being configured to develop output signals that are a decoded version of symbols that are contained in an orthogonal frequency division multiplexing (OFDM) signal that is received by said plurality of antennas via respective transmission channels;

a channels estimator, responsive to the output signals of said decision element and responsive to output signals of said FFT elements, the channels estimator being configured to generate channel estimates; and an augmentor element, responsive to the channel estimates, employing time domain and frequency domain frequency correlations of said transmission channels to develop filter coefficients and applying the developed coefficients to said filters.

12. The receiver of claim 11, wherein said channels estimator employs a delay profile of said transmission channels.

13. The receiver of claim 12, wherein the delay profile is a rectangular delay profile.

14. The receiver of claim 12, wherein the delay profile is an exponential delay profile.

15. The receiver of claim 11, wherein during a training sequence, said channels estimator is responsive to a training signal and responsive to output signals of said FFT elements.

* * * * *

UNITED STATES PATENT AND TRADEMARK OFFICE
CERTIFICATE OF CORRECTION

PATENT NO. : 8,320,500 B2  
APPLICATION NO. : 12/151419  
DATED : November 27, 2012  
INVENTOR(S) : Ye Le and Nelson Ray Sollenberger Page 1 of 1

It is certified that error appears in the above-identified patent and that said Letters Patent is hereby corrected as shown below:

In column 7, line 24, please replace "Y" with --y--.

Signed and Sealed this  
Twelfth Day of February, 2013

Teresa Stanek Rea  
*Acting Director of the United States Patent and Trademark Office*